Figure 1:
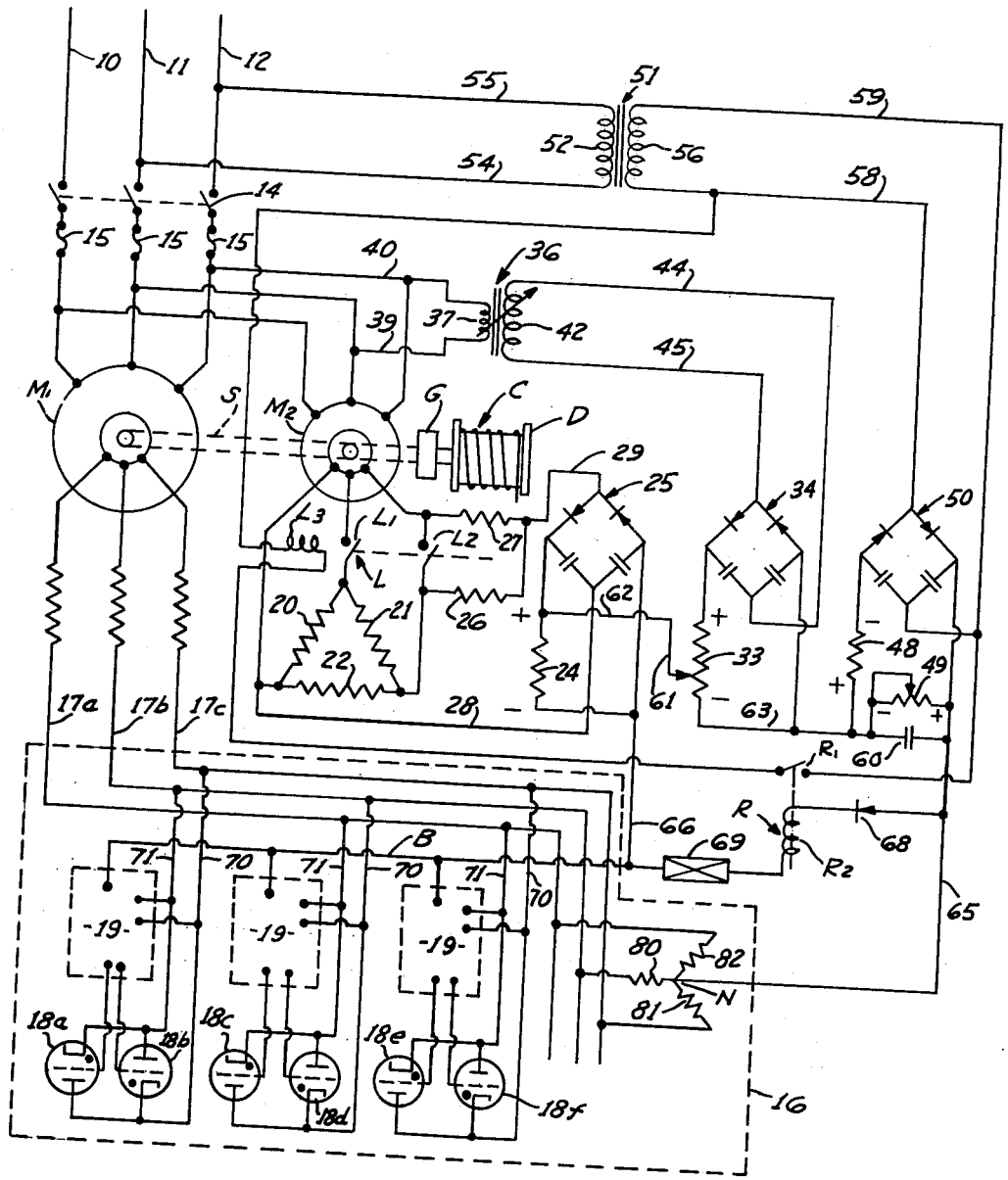

June 12, 1962

W. H. LEE 3,039,034

ALTERNATING CURRENT DRIVE AND CONTROL

Filed June 9, 1959

2 Sheets-Sheet 1

INVENTOR.
WILLIAM H. LEE
BY Bosworth, Sessions,
Herrstrom & Knowles
ATTORNEYS.

United States Patent Office 3,039,034
Patented June 12, 1962

3,039,034
ALTERNATING CURRENT DRIVE AND CONTROL
William H. Lee, Drury Lane, Waitehill Village, R.D. 3, Willoughby, Ohio
Filed June 9, 1959, Ser. No. 819,049
10 Claims. (Cl. 318—48)

This invention relates to alternating current drive and control systems and particularly to drive and control systems applicable, though not limited, to hoists.

The use of alternating current drives for hoist service has been limited by the difficulty in providing satisfactory means for controlling the speed and direction of such drives under varying loads. Drive systems have been proposed using a single reversible wound rotor induction motor, but these drives necessarily involve the switching of heavy primary currents and, further, do not provide for smooth torque transition when the motor is reversed or for smooth and effective speed control at or near zero speeds. Other alternating current systems have employed two motors in a functional division arrangement.

The present invention relates to hoist drives of the type which employ two motors arranged and coordinated so that one motor will perform the hoisting function and the other motor will perform the lowering function, and has for its principal object the provision of a control means for smoothly and effectively controlling the magnitude and direction of the torque developed by such a drive at all speeds. Another object is to provide a control means for such a drive whereby one of the two motors provides a component of the signal that is utilized to control the control means in addition to performing its ordinary hoisting or lowering function. A further object is to provide an alternating current two-motor drive and control system for a hoist in which each of the motor primaries is energized for rotation in a single direction at all times during operation of the hoist. It is yet another object to provide control means which adjust the hoisting or the lowering torque delivered by the drive by controlling the secondary currents in the respective motors. It is still a further object of my invention to provide an alternating current two-motor drive system in which the motors are nonreversible but are arranged to exert torque in opposite rotational directions, providing a smooth transition from hoisting to lowering torque or vice versa without motor torque reversal. A further object is to provide a speed control means for such a hoist drive that is inherently self-regulating under varying supply line voltage.

Briefly, I accomplish the foregoing objects by deriving a D.C. voltage from the secondary of one of the two motors which varies in accordance with the speed of the drum of the hoist from a low value at maximum speed in one direction to an intermediate value at standstill and to a high value at maximum speed in the opposite direction. This first D.C. control voltage is algebraically added to another D.C. voltage of opposite polarity which can be varied independently of drum speed and the resultant voltage provides a D.C. control signal. This signal is then applied to impedance controlling means associated with the secondary of each of the alternating current motors. The two impedance controlling means are properly biased and so connected and arranged with respect to the applied control signal that they are inversely responsive to changes in the control signal. That is, when the absolute value of the D.C. voltage control signal increases, it tends to increase the torque tending to rotate the drum in one direction and decrease the torque tending to rotate the drum in the opposite direction; and, when the control signal decreases, it tends to produce the opposite effect.

Figure 1A:
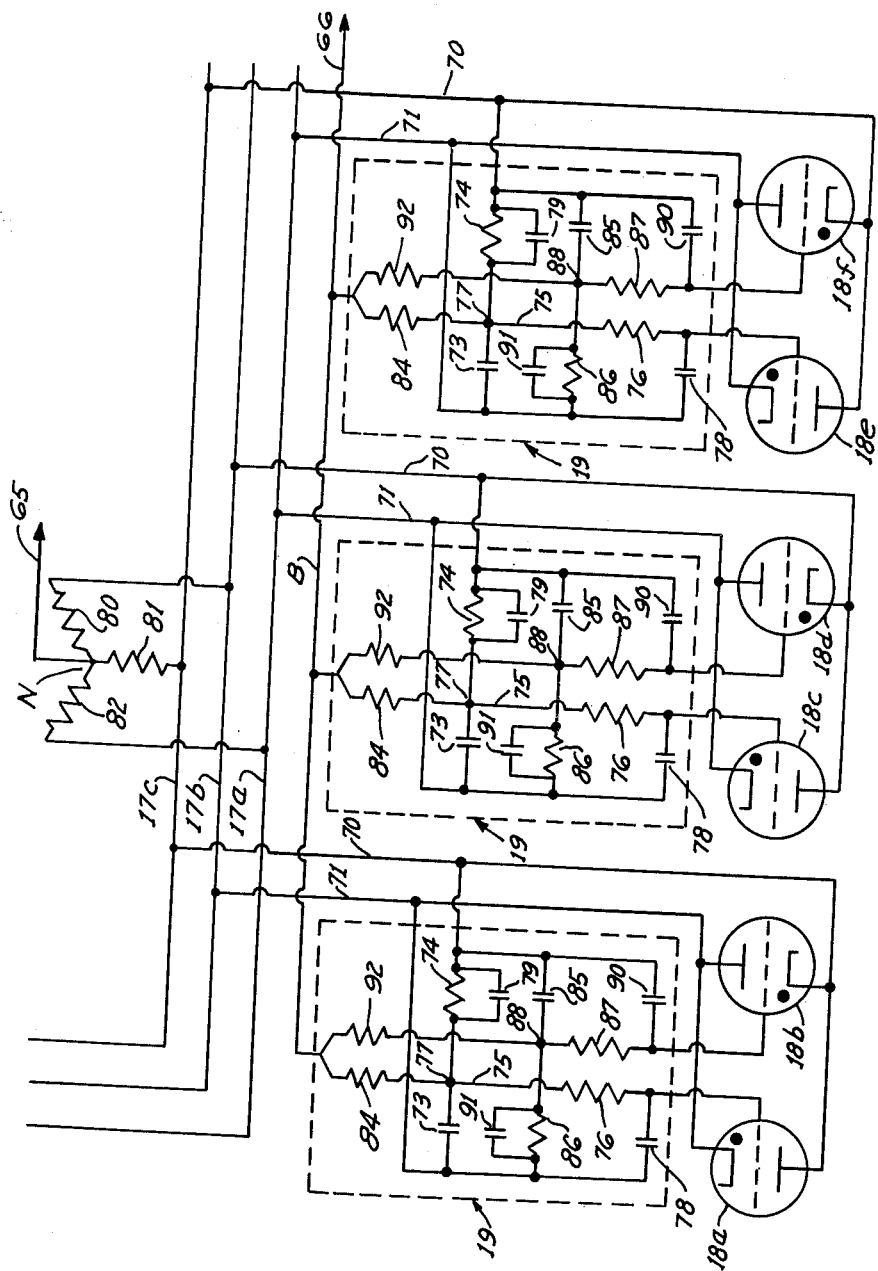

Other objects and the manner in which they are accomplished will become apparent from the following description of the invention taken together with the accompanying drawing in which:

FIGURE 1 shows schematically a circuit and coacting apparatus of a preferred embodiment of this invention, and FIGURE 1A shows in detail a portion of the circuit of FIGURE 1.

Referring to FIGURE 1, the drive system of this invention as applied to a hoist consists of two nonreversible wound rotor induction motors $M_1$ and $M_2$ connected together by a common shaft S and performing the hoisting and lowering functions, respectively. The shaft S drives conventional gearing G to which is coupled a hoisting drum D about which is wound a suitable line or cable C for lifting or lowering a load. The two motors $M_1$ and $M_2$ are energized from a conventional three phase source by means of conductors 10, 11 and 12 connected to the primaries of each of the motors in such a manner that the revolving fields produced therein rotate in opposite directions. The supply conductors 10, 11 and 12 are provided with a suitable switch 14 and conventional fuses 15.

Each of the motors is provided with impedance controlling means electrically connected to its secondary or rotor through conventional slip rings. The torque output of the hoisting motor $M_1$ is controlled by varying the impedance of its secondary windings by means indicated generally within the broken line box 16. The impedance control circuit shown comprises six thyratrons 18a, 18b, 18c, 18d, 18e and 18f arranged in inversely connected pairs across each of the three phases of the secondary winding by means of secondary lines 17a, 17b and 17c. Phase shift grid control networks associated with each pair of thyratrons, as indicated generally by broken line boxes 19, provide appropriate grid signals to each of the thyratrons to control their conduction and, thus, to provide the desired secondary impedance. The phase shift grid control network is controlled by a D.C. voltage control signal applied at two terminals, N and B which are positive and negative, respectively. FIGURE 1A shows the secondary impedance control circuit 16 including phase shift grid control networks 19 in full detail and is described below.

The impedance control circuit for controlling the speed of the motor $M_1$, which is briefly described above, is fully disclosed in my copending application, Serial No. 695,016, filed November 7, 1957. In the present invention, any suitable means for controlling the torque output of motor $M_1$ by varying its secondary impedance in accordance with a D.C. control signal may be used. The only requirement of the controlling means is that it vary the impedance of the secondary of the controlled motor in accordance with a D.C. voltage control signal.

The torque produced by lowering motor $M_2$ is preferably controlled by a bank of delta-connected external resistances 20, 21 and 22. This resistance bank is connected in circuit with the secondary of motor $M_2$ through conventional slip rings and under the control of a lowering motor relay L having contacts $L_1$ and $L_2$ and a control winding $L_3$. When the relay is de-energized and contacts $L_1$ and $L_2$ are open as shown in the drawing, the rotor circuit of motor $M_2$ is open and no torque is developed by the motor. When the relay L is energized and contacts $L_1$ and $L_2$ are closed, the torque developed by motor $M_2$ is dependent upon the rotor current allowed to flow by resistances 20, 21 and 22. The manner in which the relay L is controlled is explained below. The secondary impedance of lowering motor $M_2$ may, of course, be controlled by any suitable means as, for example, the impedance control circuit described herein in connection with hoisting motor $M_1$.

The D.C. voltage control signal for controlling the torque developed by each of the motors $M_1$ and $M_2$ is made up of three component voltages. The first component $E_1$ of the D.C. control voltage is developed across resistance 24 connected across the output of conventional voltage doubler indicated generally at 25. The alternating current input to voltage doubler 25 is supplied from the secondary circuit of lowering motor $M_2$ through a voltage divider comprised of resistances 22, 26 and 27 by means of conductors 28 and 29. Because the primary of lowering motor $M_2$ is nonreversibly energized at all times during operation of the hoist, the alternating current supplied to voltage doubler 25 and, thus, the D.C. voltage component $E_1$ will vary in proportion to the departure of the hoist drum speed from maximum lowering speed, or in proportion to the voltage induced in the secondary of motor $M_2$. In other words, at maximum lowering speed, the voltage of the lowering motor $M_2$ secondary and component voltage $E_1$ derived from it is at its minimum value. At standstill, the voltage of the lowering motor $M_2$ secondary is at a level that is some proportion of line voltage dependent upon the design of the motor and a positive voltage component $E_1$ of intermediate value appears across resistance 24. At maximum hoisting speed, the voltage of the lowering motor $M_2$ secondary is approximately twice its standstill value and the D.C. component voltage $E_1$ appearing across resistance 24 assumes its largest value.

The second component $E_2$ of the D.C. voltage control signal is developed across the potentiometer 33 which is connected to the output of a conventional voltage doubler indicated generally at 34. The alternating current input to voltage doubler 34 is supplied by one phase of the alternating current supply to the motors through an induction regulator 36. The primary 37 of induction regulator 36 is connected by means of conductors 39 and 40 to supply conductors 11 and 12, respectively. The secondary 42 of induction regulator 36 is connected by means of conductors 44 and 45 to the input of voltage doubler 34.

Component $E_3$ is developed across resistance 48 and variable resistance 49 connected across the output of a full-wave voltage doubler indicated generally at 50. Voltage doubler 50 is supplied with an alternating current input from one phase of the line voltage by means of a power transformer 51. The primary 52 of transformer 51 is connected by conductors 54 and 55 to supply conductors 11 and 12, respectively. The secondary 56 of transformer 51 is connected by means of conductors 58 and 59 to the input of voltage doubler 50. A smoothing condenser 60 is connected in parallel across variable resistance 49.

It will be noted that voltage doubler 50 is connected through transformer 51 to supply conductors 11 and 12 on the alternating current source side of switch 14 so that component $E_3$ of the D.C. voltage control signal is always present whether or not the primaries of motors $M_1$ and $M_2$ are energized. The alternating current supply for voltage doubler 34 through induction regulator 36 is tapped from supply conductors 11 and 12 between switch 14 and the motor primaries so that the presence of component $E_2$ of the D.C. control voltage is under the control of switch 14. It is to be understood, of course, that voltage doublers 34 and 50 may be supplied from any one of the three phases of supply voltage and need not be supplied from the same phase.

The component voltages $E_1$, $E_2$ and $E_3$ are combined in the following manner to produce a single D.C. voltage control signal. Component voltages $E_1$ and $E_3$ are connected so as to be additive to each other while component voltage $E_2$ is connected in opposition to both component voltages $E_1$ and $E_3$. In the preferred form of the invention as illustrated in the drawing, this is accomplished by connecting the positive end of resistance 24 to the movable contact 61 of potentiometer 33 by means of conductor 62. The negative end of potentiometer 33 is connected by conductor 63 to the negative end of variable resistance 49. The D.C. voltage control signal thus appears between the negative end of resistance 24 and the positive end of variable resistance 49.

The D.C. voltage control signal is applied to the phase shift grid control networks 19 associated with the impedance controlling means 16 by means of conductors 65 and 66 connected to the positive and negative terminals N and B, respectively. Connected across the conductors 65 and 66 is the winding $R_2$ of an auxiliary relay R.

Between conductor 65 and one end of winding $R_2$ is a diode 68 and between conductor 66 and the other end of winding $R_2$ is a non-linear resistance 69. Auxiliary relay R has a contact $R_1$ connected in series with winding $L_3$ of lowering motor relay L across conductors 58 and 59. The energization of winding $R_2$ by the D.C. voltage control signal appearing across conductors 65 and 66 acts to close contact $R_1$ of auxiliary relay R, energizing the winding $L_3$ of lowering motor relay L. Thus, when the D.C. voltage control signal applies sufficient voltage across winding $R_2$ of auxiliary relay R, lowering motor relay L is energized and the secondary circuit of lowering motor $M_2$ is closed through resistances 20, 21 and 22 so that lowering motor $M_2$ provides torque in the lowering direction. When the D.C. voltage control signal applied across winding $R_2$ of auxiliary relay R is insufficient to close the relay, lowering motor relay L is de-energized and the secondary circuit of lowering motor $M_2$ is open so that lowering motor $M_2$ develops no torque.

It will be noted that component voltage $E_1$ of the D.C. voltage control signal is provided by the secondary circuit of lowering motor $M_2$ irrespective of the position of contacts $L_1$ and $L_2$ of lowering motor relay L. In addition, the voltage thus provided by the secondary circuit of lowering motor $M_2$ is substantially the same in the region of zero shaft speed whether contacts $L_1$ and $L_2$ are opened or closed.

Non-linear element 69 can be any element whose resistance substantially instantaneously and non-linearly decreases as the voltage applied across it increases. Such an element is a "Thyrite" resistor manufactured by the General Electric Company of Schenectady, New York. Element 69 is provided so that auxiliary relay R will open and close at substantially the same level of applied voltage.

The secondary impedance control circuit I prefer to employ for controlling the torque developed by motor $M_1$ is shown in detail in FIGURE 1A. As stated above, the impedance control circuit comprises six thyratrons, $18a$, $18b$, $18c$, $18d$, $18e$ and $18f$, arranged in inversely connected pairs across each of the three phases of the secondary winding of motor $M_1$ by means of secondary lines $17a$, $17b$ and $17c$. The connections and the components for the controls of the three phases are identical. Accordingly, only the control for the secondary winding connected to conductors $17c$ and $17b$ will be described in detail herein. Identical reference characters have been applied to the controls for the other two phases of the rotor circuit, and it will be understood that these controls function in the same manner as the control described below.

As shown in FIGURE 1A, the plate or anode of thyratron $18a$ is connected to line $17c$ through conductor 70 while its cathode is connected to line $17b$ through conductor 71. The plate of thyratron $18b$ is connected to line $17b$ through conductor 71, and its cathode is connected to line $17c$ through conductor 70. These thyratrons, therefore, control the impedance of one phase of the rotor winding, and in like manner the thyratrons $18c$ and $18d$, and $18e$ and $18f$ control the impedances of the other phases of the rotor winding. The grids of the thyratrons control the firing thereof and hence control the impedance of the secondary circuit. If the grid voltage exceeds the critical voltage of the tubes late in the positive half cycles of the plate voltages thereof, then the tubes fire late in the half cycles, the impedance of the tubes and of the secondary circuit of the motor is relatively great, and the motor operates at light load or at a relatively small percentage of its capacity. If the grid voltage is changed so that the critical voltage of the tubes is exceeded earlier in the positive half cycles of plate voltage, then the tubes fire earlier, the impedance of the secondary circuit is reduced, and the motor operates at a greater percentage of its capacity or at a greater speed under a given load. If the tubes are fired substantially at the beginning of each positive half cycle of the plate or anode voltage, the motor operates at substantially full load. If, on the other hand, the grid voltage is held sufficiently negative so that it never exceeds the critical voltage, then the motor will stop. Thus, as is known, the motor can be controlled throughout its range by appropriate control of the grid voltage of the thyratrons.

The grid voltage contains an A.C. component that is derived from the motor secondary and is controlled automatically by a resistance-capacitance network so that it has at all times, regardless of the speed of operation of the motor, a substantially constant phase relationship to the plate voltage applied to the thyratrons and a substantially constant amplitude (assuming that the line voltage of the A.C. supply to the motor remains substantially constant). Preferably, the A.C. component of the grid voltage lags the plate voltage by about 90°. The grid voltage also contains a D.C. component or bias and by varying the D.C. component while maintaining the A.C. component substantially constant in phase relationship and amplitude, the point in the positive half cycle of the plate voltage at which the grid voltage exceeds the critical voltage of the tube can be varied and, accordingly, the firing of the tubes can be controlled.

The network for providing the lagging grid voltage preferably comprises capacitor 73 and resistor 74 which are connected in series across conductors 70 and 71 and thus across the anode cathode circuit of thyratron 18a. The grid potential is provided by a lead 75 extending to the grid of thyratron 18a through a resistor 76, the lead 75 being connected to point 77 between capacitor 73 and resistor 74. A capacitor 78 is connected across the grid and the cathode of thyratron 18a through conductor 71 to complete the phase shift resistance-capacitance network. The A.C. component of the grid voltage is thus the voltage appearing across condenser 78. In the preferred form of the invention shown in the drawing, a small condenser 79 is connected across the resistor 74. This condenser improves the accuracy of the maintenance of the phase relationship between grid and plate voltages throughout a wide range of frequencies but is not necessary for eminently satisfactory operation of the system.

The required D.C. signal to control the level of the grid voltage is provided by impressing a D.C. control voltage between the neutral point N of the Y-connected resistors 80, 81 and 82, which are connected across the conductors 17a, 17b and 17c, and the conductor B which is connected through resistor 84 to point 77.

The control for the grid voltage of thyratron 18b is substantially identical to that described for thyratron 18a. This network includes the capacitor 85 and resistor 86 connected across the plate-cathode circuit of the thyratron 18b; the resistor 87 connected between point 88 and the grid of thyratron 18b; the capacitor 90 connected between the grid and the cathode circuit of the thyratron; and the small capacitor 91 connected across resistor 86. The D.C. bias is provided from conductor B through resistor 92 which is connected to point 88.

The alternating current drive control system of this invention operates as follows: The drive is put into operation by closing switch 14. With switch 14 closed, the primary windings of hoisting motor $M_1$ and lowering motor $M_2$ are continuously energized and, as previously stated, are connected so that the flux fields produced therein rotate in opposite directions. It will be noted that negative bias voltage component $E_3$ of the D.C. voltage control signal is always applied across signal conductors 65 and 66 irrespective of the position of switch 14. I prefer this arrangement because it insures positive grid control of the thyratrons 18 in the secondary impedance controlling circuit of hoisting motor $M_1$ upon the application of plate voltage to the thyratrons when the hoisting motor $M_1$ primary is energized.

At standstill, the algebraic sum of component voltages $E_1$, $E_2$ and $E_3$ comprising the D.C. voltage control signal is such that the thyratrons 18 are held nonconducting and relay R is in a released position so that the secondaries of both motors are open and no torque is developed. This control signal is arrived at by the proper adjustment of the values of component voltages $E_2$ and $E_3$, component $E_1$ being proportional to the departure of the speed of the rotor of lowering motor $M_2$ from maximum lowering speed. Component voltage $E_2$ can be adjusted by means of induction regulator 36 and potentiometer 33. I prefer to use potentiometer 33 as a calibration or a zero adjustment and induction regulator 36 as the control adjustment, thus avoiding the use of sliding contacts during the normal operation of the control system. Component voltage $E_3$ may be adjusted by means of variable resistance 49 and is set so that when component voltages $E_1$ and $E_2$ are equal and opposite, component $E_3$ will prevent the firing of thyratrons 18 in the secondary of hoisting motor $M_1$.

In order to operate the drive to hoist a load, induction regulator 36 is positioned to increase its output and the voltage drop across potentiometer 33, thus reducing the effect of negative bias component $E_3$ so that the thyratrons 18 will begin to conduct and hoisting torque will be developed in motor $M_1$. As the motor accelerates from standstill in the hoisting direction, the value of component $E_1$ increases; and, because it is connected in opposition to component $E_2$, it tends to balance the increase in component voltage $E_2$. The magnitude of the load being hoisted will determine the speed of the drive and thus the magnitude of balancing voltage component $E_1$. Therefore, when hoisting a light load, component voltage $E_1$ will tend more nearly to balance the increase in component voltage $E_2$ of the control signal introduced by the change in position of induction regulator 36 than when hoisting a heavy load. In this manner, the control system causes the drive to develop a hoisting torque commensurate with the load to be hoisted and speed of operation is determined approximately by the position of the induction regulator, regardless of variations in load.

During operation of the drive in the hoist direction, the value of the D.C. voltage control signal is always below that value necessary to close relay R and thus the lowering motor relay L controlling the secondary circuit of lowering motor $M_2$. Lowering motor $M_2$, therefore, functions during hoisting operations only in the manner of a tachometer generator to produce component voltage $E_1$ and develops no torque. In fact, the value of the D.C. voltage control signal varies inversely with hoisting speed and with the magnitude of the load being hoisted so that under all conditions of speed and load during hoisting, the value of the D.C. voltage control signal will always be less than its standstill value which is insufficient to operate relay $R_2$ to close the secondary of lowering motor $M_2$.

In order to produce lowering torque, induction regulator 36 of the control system is positioned to produce a decrease in component voltage $E_2$ which aids component voltage $E_3$ in holding the thyratrons of the hoisting motor $M_1$ secondary nonconducting. This decrease in component voltage $E_2$ also results in an increase in the algebraic sum of all the component voltages. The increase in the value of the D.C. voltage control signal produced by the above change in component voltage $E_2$ results in a control voltage sufficient to close relay R and thus lowering motor relay L which closes the secondary circuit of lowering motor $M_2$ through resistances 20, 21 and 22 whereby lowering torque is developed. As the drive shaft S accelerates, lowering motor $M_2$ produces lowering torque as well as a decreasing tachometer generator output so that component voltage $E_1$ decreases and attempts to balance the change in oppositely connected component voltage $E_2$. Contrary to the interaction of component voltages during the production of hoisting torque, component voltage $E_1$ may not only actually equal voltage $E_2$ but it may, because of the weight of the load acting in a lowering direction, exceed in absolute value the change in component voltage $E_2$, decreasing the value of the D.C. voltage control signal. If the load is heavy enough, the absolute value of the control signal will decrease to the point that relay R is dropped, opening the secondary of lowering motor $M_2$ and thyratrons 18 are rendered conductive, producing a hoisting torque in opposition to the rotation of the shaft in the lowering direction. It is apparent, therefore, that, for a given load which is desired to be lowered at a given speed, the control of this invention acts upon the drive motors $M_1$ and $M_2$ so that they exert on the drive shaft S the necessary hoisting or lowering torque to produce that desired speed.

During all operations of the drive, component voltage $E_3$ remains constant at its value determined by the setting of variable resistance 49. Component voltage $E_2$ increases or decreases in accordance with the positioning of induction regulator 36 and/or potentiometer 33. Component voltage $E_1$, derived from the secondary of lowering motor $M_2$ acting in the manner of a tachometer generator, always tends to follow and attempts to equal the change produced in component voltage $E_2$ and any departure from the equality of these component voltages varies with the magnitude of the load on the drive and the direction in which that load is being moved.

A noteworthy advantage of the preferred form of the drive described herein is its behavior when the supply line voltage varies. Increases and decreases in the voltage applied to the primary of motor $M_1$ produces corresponding increases and decreases in the voltage applied to the plates and cathodes of the thyratrons in the secondary impedance control circuit and thus corresponding changes in the grid voltage necessary to fire the thyratrons in accordance with the firing curve of the particular thyratrons employed. If the plate-to-cathode voltage applied to a negative control thyratron increases as a result of the line voltage increase, the tube will fire at a more negative level of grid voltage; or, in other words, an increase in the plate-to-cathode voltage requires a more negative grid bias to hold the tube nonconducting. It will be seen that the bias voltage components of the D.C. voltage control signal will change in an amount proportional to the change in supply line voltage and in a direction that follows the corresponding changes produced in the critical grid voltage of the thyratrons. Thus, the effect of changes in supply line voltage that might otherwise result in loss of grid control of thyratrons is minimized.

Those skilled in the art will appreciate that various changes and modifications can be made in the preferred form of apparatus described herein without departing from the spirit and scope of the invention.

I claim:

1. An alternating current drive and control for selectively driving loads of varying magnitude in opposite directions comprising two wound rotor induction motors coupled to an output shaft and each energized to supply torque to said output shaft in a directionally opposite sense to the other, circuit means associated with each of the motors for controlling motor secondary impedance, means for providing a first control signal proportional to the voltage induced in the secondary of one of said motors, means for providing a second variable control signal proportional to desired speed, and means for combining said first and second control signals into a resultant signal and applying said resultant signal to both of said circuit means for controlling the secondary impedance of each of said motors whereby said second control signal modified by said first control signal controls the torque output of said motors.

2. An alternating current drive and control for selectively driving loads of varying magnitude in opposite directions comprising two wound rotor induction motors coupled to an output shaft and each energized to supply torque to said output shaft in a directionally opposite sense to the other, circuit means associated with each of said motors inversely responsive with respect to the other to a like D.C. control signal for controlling secondary impedance of said associated motor, means in circuit with the secondary of one of said motors for providing a first D.C. control signal proportional to the voltage induced in the secondary, means for providing a second variable D.C. control signal proportional to desired speed, and means for combining said first and second D.C. control signals into a resultant D.C. signal and applying said resultant D.C. signal to both of said circuit means for controlling the secondary impedance of each of said motors whereby said second D.C. control signal modified by said first D.C. control signal controls the torque output of said motors.

3. An alternating current drive and control for selectively driving loads of varying magnitude in opposite directions comprising two wound rotor induction motors coupled to an output shaft and each energized to supply torque to said output shaft in a directionally opposite sense to the other, circuit means associated with each of said motors inversely responsive with respect to the other to a like D.C. control signal for controlling the motor secondary impedance, an impedance across one phase of the secondary of one of said motors, a first rectifier means in parallel with said fixed impedance for providing a first D.C. control signal proportional to the voltage induced in the secondary of one of said motors, a second rectifier means for providing a second variable D.C. control signal having a value independent of the induced secondary voltage of said motors and means for subtracting one of said signals from the other to produce a resultant signal and applying said resultant signal to both of said circuit means for controlling the motor secondary impedances whereby said second control signal modified by said first control signal controls the torque output of said first and second motors.

4. An alternating current drive and control for selectively driving loads of varying magnitude in opposite directions comprising two wound rotor induction motors coupled to an output shaft and each energized to supply torque to said output shaft in a directionally opposite sense to the other, means responsive to a D.C. control signal in circuit with and adapted to control the impedance of one motor secondary, a plurality of resistors associated with the other motor secondary, relay means responsive to a D.C. control signal for opening and for closing said other motor secondary through said resistors, said means and said relay means being inversely responsive with respect to the other to the absolute value of a common D.C. control signal whereby the impedance of said one motor secondary varies directly with the absolute value of said common D.C. control signal and the impedance of said other motor secondary varies from a high value to a low value when the absolute value of said common D.C. control signal is below and above, respectively, a predetermined magnitude, means associated with said other motor secondary for providing a first D.C. potential proportional to the A.C. voltage induced in said associated secondary, a D.C. reference potential, and means for combining said first D.C. potential with said D.C. reference potential to provide a resultant D.C. voltage control signal to both of said secondary impedance controlling means whereby said motors supply opposing torques to said output shaft in accordance with the level of said D.C. reference potential and the load on said output shaft.

5. An alternating current drive and control for selectively driving loads of varying magnitude in opposite directions comprising two wound rotor induction motors coupled to an output shaft and each energized to supply torque to said output shaft in a directionally opposite sense to the other, means responsive to a D.C. control signal in circuit with and adapted to control the impedance of one motor secondary, a plurality of resistors associated with the other motor secondary, relay means responsive to a D.C. control signal for opening and for closing said other motor secondary through said resistors, said means and said relay means being inversely responsive with respect to the other to the absolute value of a common D.C. control signal whereby the impedance of said one motor secondary varies directly with the absolute value of said common D.C. control signal and the impedance of said other motor secondary varies from a high value to a low value when the absolute value of said common D.C. control signal is below and above, respectively, a predetermined magnitude, an impedance in circuit with said other motor secondary, a rectifier means in parallel with said impedance for providing a first D.C. potential proportional to the A.C. voltage induced in said associated secondary, a D.C. reference potential, and means for combining said first D.C. potential with said D.C. reference potential to provide a resultant D.C. voltage control signal to both of said secondary impedance controlling means whereby said motors supply opposing torques to said output shaft in accordance with the level of said D.C. reference potential and the load on said output shaft.

6. An alternating current drive and control for selectively driving loads of varying magnitude in opposite directions comprising two wound rotor induction motors coupled to an output shaft and each energized to supply torque to said output shaft in a directionally opposite sense to the other, a plurality of controlled arc discharge devices in circuit with and adapted to control the impedance of one motor secondary, a grid control circuit responsive to a D.C. control signal for controlling the firing of said discharge devices, circuit means associated with the other motor secondary and responsive to a D.C. control signal for controlling the secondary impedance of said other motor, said grid control circuit and said circuit means being inversely responsive with respect to the other to the absolute value of a common D.C. control signal, means associated with one of said motor secondaries for providing a first D.C. potential proportional to the A.C. voltage induced in said associated secondary, a D.C. reference potential, and means for combining said first D.C. potential with said D.C. reference potential to provide a resultant D.C. signal to both of said secondary impedance controlling means whereby said motors supply opposing torques to said output shaft in accordance with the level of said D.C. reference potential and the load on said output shaft.

7. An alternating current drive and control for selectively driving loads of varying magnitude in opposite directions comprising two wound rotor induction motors coupled to an output shaft and each energized to supply torque to said output shaft in a directionally opposite sense to the other, a plurality of controlled arc discharge devices in circuit with and adapted to control the impedance of one motor secondary, a grid control circuit responsive to a D.C. control signal for controlling the firing of said discharge devices, circuit means associated with the other motor secondary and responsive to a D.C. control signal for controlling the secondary impedance of said other motor, said grid control circuit and said circuit means being inversely responsive with respect to the other to the absolute value of a common D.C. control signal, an impedance in circuit with said other motor secondary, a first rectifier means in parallel with said impedance for providing a first D.C. potential proportional to the A.C. voltage induced in said associated secondary, a D.C. reference potential, and means for combining said first D.C. potential with said D.C. reference potential to provide a resultant D.C. signal to both of said secondary impedance controlling means whereby said motors supply opposing torques to said output shaft in accordance with the level of said D.C. reference potential and the load on said output shaft.

8. An alternating current drive and control for selectively driving loads for varying magnitude in opposite directions comprising two wound rotor induction motors coupled to an output shaft and each energized to supply torque to said output shaft in a directionally opposite sense to the other, a plurality of controlled arc discharge devices in circuit with and adapted to control the impedance of one motor secondary, a grid control circuit responsive to a D.C. control signal for controlling the firing of said discharge devices, a plurality of resistors associated with the other motor secondary, relay means responsive to a D.C. control signal for opening and for closing said other motor secondary through said resistors, said grid control circuit and said relay means being inversely responsive with respect to the other to the absolute value of a common D.C. control signal whereby the impedance of said one motor secondary varies directly with the absolute value of said common D.C. control signal and the impedance of said other motor secondary varies from a high value to a low value when the absolute value of said common D.C. control signal is below and above, respectively, a predetermined magnitude, means associated with said other motor secondary for providing a first D.C. potential proportional to the A.C. voltage induced in said associated secondary, a D.C. reference potential, and means for combining said first D.C. potential with said D.C. reference potential to provide a resultant D.C. control signal to both of said secondary impedance controlling means whereby said motors supply opposing torques to said output shaft in accordance with the level of said D.C. reference potential and the load on said output shaft.

9. An alternating current drive and control for selectively driving loads of varying magnitude in opposite directions comprising two wound rotor induction motors coupled to an output shaft and each energized to supply torque to said output shaft in a directionally opposite sense to the other, a plurality of controlled arc discharge devices in circuit with and adapted to control the impedance of one motor secondary, a grid control circuit responsive to a D.C. control signal for controlling the firing of said discharge devices, a plurality of resistors associated with the other motor secondary, relay means responsive to a D.C. control signal for opening and for closing said other motor secondary through said resistors, said grid control circuit and said relay means being inversely responsive with respect to the other to the absolute value of a common D.C. control signal whereby the impedance of said one motor secondary varies directly with the absolute value of said common D.C. control signal and the impedance of said other motor secondary varies from a high value to a low value when the absolute value of said common D.C. control signal is below and above, respectively, a predetermined magnitude, an impedance in circuit with said other motor secondary, a first rectifier means in parallel with said impedance for providing a first D.C. potential proportional to the A.C. voltage induced in said other motor secondary, a D.C. reference potential, and means for combining said first D.C. potential with said D.C. reference potential to provide a resultant D.C. control signal to both of said secondary impedance controlling means whereby said motors supply opposing torques to said output shaft in accordance with the level of said D.C. reference potential and the load on said output shaft.

10. An alternating current drive and control for selectively driving loads of varying magnitude in opposite directions comprising two wound rotor induction motors coupled to an output shaft and each energized to supply torque to said output shaft in a directionally opposite sense to the other, impedance controlling means associated with the secondary of each of said motors for varying the magnitude of the torque supplied by its associated motor to said output shaft, each of said impedance controlling means being inversely responsive with respect to the other to a common D.C. voltage control signal, first and second resistances connected in series, rectifier means connected across one phase of the secondary of one of said motors for providing a first D.C. potential across said first resistance proportional to the differential rotative speed of the primary flux field and the rotor secondary of said one of said motors, means for providing an adjustable second D.C. potential across said second resistance so that said second D.C. potential opposes said first D.C. potential to provide a D.C. control voltage across the series combination of said first and second resistances, circuit means connecting said series combination in parallel with said impedance controlling means.

References Cited in the file of this patent

UNITED STATES PATENTS

| | | |
|---|---|---|
| 2,209,364 | Sweeny | July 30, 1940 |
| 2,312,592 | Seeger et al. | Mar. 2, 1943 |
| 2,467,986 | Pell et al. | Apr. 19, 1949 |
| 2,501,361 | Taylor | Mar. 21, 1950 |
| 2,717,349 | Lee | Sept. 6, 1955 |
| 2,978,130 | Rhine | Apr. 4, 1961 |